United States Patent
Salett et al.

(12) 
(10) Patent No.: US 6,226,290 B1
(45) Date of Patent: May 1, 2001

(54) METHOD AND APPARATUS FOR ADJUSTING AN INTERPACKET GAP USING A NETWORK DEVICE IN A DATA COMMUNICATIONS NETWORK

(75) Inventors: Ronald M. Salett, Framingham; David B. Fite, Jr., Northborough; Nicholas Ilyadis, Pepperell, all of MA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/069,072

(22) Filed: Apr. 28, 1998

(51) Int. Cl.[7] .................................................. H04L 12/28
(52) U.S. Cl. ............................................................ 370/389
(58) Field of Search ...................................... 370/351, 384, 370/392, 394, 400, 465, 469, 470, 471, 472, 473, 474, 504, 412, 428

(56) References Cited

U.S. PATENT DOCUMENTS

| | | | |
|---|---|---|---|
| 5,870,398 | * | 2/1999 | Kotchey ................................ 370/445 |
| 6,105,064 | * | 8/2000 | Davis et al. ......................... 709/224 |

OTHER PUBLICATIONS

"Inteframe Gap Shrinkage: 7.7 A Simple Model 2 Configuration Example" at http://www.ots.utexas.edu:8080/ethernet/10quickref/ch7qr 18.html , Quick Reference Guide to 10–Mbps Multi–Segment Configuration, Sep. 9, 1995.

Ethernet Switching at http://www.nmic.doe.gov/winston/switch.htlml, pp. 1–4, Mar., 1998.

"Calculating the Interframe Gap Shrinkage" at http://wwwhost.ots.utexas.edu/ethernet/10quickref/ch7qr 8.html, Wuick Reference Guide to 10–Mbps Multi–Segment Configuration, Sep. 9, 1995..

"Inteframe Gap Shrinkage: 7.6 A Simple Model 2 Configuration Example" at http://www.ots.utexas.edu:8080/ethernet/10quickref/ch7qr 12.html, Quick Reference Guide to 10–Mbps Multi–Segment Configuration, Sep. 9, 1995.

"Ethernet Tutorial" at http://www.six.es/tutorial.htm, Manual Ethernet Page, Mar. 8, 1998.

* cited by examiner

*Primary Examiner*—David R. Vincent
(74) *Attorney, Agent, or Firm*—Blakely Sokoloff Taylor & Zafman LLP

(57) ABSTRACT

A method and an apparatus for adjusting an interpacket gap. In one embodiment, a plurality of network devices are tightly coupled together in series. Data is transmitted and received by the network devices in packets with interpacket gaps interposed between each packet. Buffers are included in each network device to serve as elasticity buffers for the data being transmitted between the network devices. The first upstream network device transmits interpacket gaps having an increased size. Downstream network devices may shrink increased size interpacket gaps to reduced size interpacket gaps if the internal buffers are filled to or above a high water mark. However, downstream network devices are not allowed to shrink the size of reduced size interpacket gaps that are received, even if their internal buffers are filled to or above the high water mark.

18 Claims, 3 Drawing Sheets

METHOD AND APPARATUS FOR ADJUSTING AN INTERPACKET GAP USING A NETWORK DEVICE IN A DATA COMMUNICATIONS NETWORK

BACKGROUND OF THE INVENTION

1. Field of the Invention

The present invention relates generally to data communications networks and, more specifically, the present invention relates to interpacket gaps interposed between data packets of a data communications network.

2. Background Information

Computer networks are used to interconnect many computing resources, such as for example computers, workstations, servers, printers, modems, storage devices, etc. For example, two or more computers may be connected together through a network medium. Network users are able to share files, printers and other resources, send messages and run applications on remote computers. An important part of any computer network includes the physical components or network communications devices used to interconnect the computing resources.

Local area networks are generally those networks that are confined to a limited physical location. As the size of a network increases, the number of nodes that load the network and the lengths of cables used to interconnect the nodes of the network increase correspondingly. However, as network size increases, the quality of the signals being transferred within the network deteriorates. Furthermore, network traffic also increases as network size increases, which results in an increased number of packet collisions and slower overall network performance.

Known methods of increasing the size and improving the performance of large networks include the utilization of network devices such as for example repeaters, switches, bridges, concentrators, hubs, or the like, to interconnect various smaller segments of the network. For example, a network device such as a repeater may be used to connect two or more network segments. The network device receives signals and provides signal amplification and retiming as necessary to clean up or restore the received signals, which may have deteriorated before being received by the network device. After the network device restores the signals, the signals may be retransmitted to the other parts of the network.

FIG. 1 is an illustration of a network 101 including a plurality of network devices 103, 105, 107 and 109 tightly coupled together in series. In the example illustrated in FIG. 1, the data contained in the signals transmitted between the network devices is organized into bit streams of packets or frames, with interpacket gaps interposed between each packet. Packets and interpacket gaps are received by network device 103 and then are retransmitted to network device 105. The packets and interpacket gaps are then retransmitted from network device 105 to network device 107, and so on.

It is noted that each one of the plurality of network devices 103, 105, 107 and 109 include an internal reference clock used to transmit and receive the packets to and from the corresponding neighboring network devices. In theory, all of the network devices 103, 105, 107 and 109 transmit and receive data at precisely the same speed. However, in reality, there is often at least a slight difference between the internal clock speeds of the neighboring devices. Consequently, there is a real possibility that one network device will send data faster than the recipient network device can send the data.

One known method of addressing the problem of clock differences between network devices is the utilization of elasticity buffers within each network device in combination with inserting interpacket gaps between the packets. In particular, data that is received from a neighboring upstream network device is stored within each network device in an elasticity buffer. Interpacket gaps are provided between packet transmissions to provide the network devices some recovery time between frames. Indeed, if the bit stream of a data packet were infinitely long, the elasticity buffer of the receiving network device would overflow.

As a series of frames propagates through series coupled network devices 103, 105, 107 and 109, the various timing differences, combined with the effects of signal amplification and restoration, may result in the shrinkage of the interpacket gaps. For example, assume that the internal clock in network device 109 runs slower than the internal clock in network device 107, which runs slower than the internal clock in network device 105, which runs slower than the internal clock in network device 103. Consequently, each upstream network device in FIG. 1 transmits faster than the neighboring downstream network device can transmit.

To address this situation, each one of the network devices 105, 107 and 109 shrink the interpacket gaps before retransmitting the packets downstream. Otherwise, the elasticity buffer within each network device would overflow. In addition, it is noted that generally at least an absolute minimum interpacket gap size must be maintained. An interpacket gap size that is too small may result in frames being overrun and therefore lost frames, which would need to be retransmitted.

Consequently, frames are generally sent with largely oversized interpacket gaps from upstream network devices to accommodate the possibility of all downstream network devices having to shrink the interpacket gap in the same pass. Thus, it is ensured that downstream network devices will receive the frames with interpacket gaps having at least the minimum required size, even if every intermediate network device had to shrink the interpacket gap.

One disadvantage of transmitting frames with largely oversized interpacket gaps from the upstream network devices is that a large amount of bandwidth and speed is sacrificed to ensure that the downstream network devices receive frames with adequately sized interpacket gaps. Thus what is desired is a method and an apparatus for transmitting frames in a network with interpacket gaps that are smaller than the largely oversized interpacket gaps discussed above, but still greater than or equal to the minimum required size. By transmitting smaller interpacket gaps, overall network bandwidth and speed will be improved.

SUMMARY OF THE INVENTION

A network device is disclosed. In one embodiment, the network device includes a buffer coupled between an input port and an output port of the network device. The buffer is coupled to buffer packets propagating through a data communications network received through the input port. An interpacket gap is interposed between each packet received through the input port. The network device also includes an adjuster coupled to the buffer. The adjuster selectively adjusts a size of the interpacket gap received through the input port. Packets are retransmitted from the output port of the network device with the size of the interpacket gap maintained if the interpacket gap is received at the input port at a reduced size when the buffer is filled to a level at or above a first level of capacity of the buffer or when the buffer is filled to a level below the first level of capacity of the buffer.

BRIEF DESCRIPTION OF THE DRAWINGS

The present invention is illustrated by way of example and not limitation in the accompanying figures.

DETAILED DESCRIPTION

A method and an apparatus for adjusting an interpacket gap using a network device is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, the present invention provides network communications with network devices, such as for example repeaters, that are coupled in series. In another embodiment, the network devices are stackable network switches organized in a ring topology. In still another embodiment, the network devices are network bridges, concentrators, or the like. The network device of the present invention include buffers and interpacket gap adjusters that enable relatively smaller interpacket gaps to be propagated through the network while maintaining at least an absolute minimum interpacket gap size. Thus, overall network performance is improved without an increased risk of frame loss since interpacket gap sizes are maintained above the absolute minimum interpacket gap size.

Figure 2:
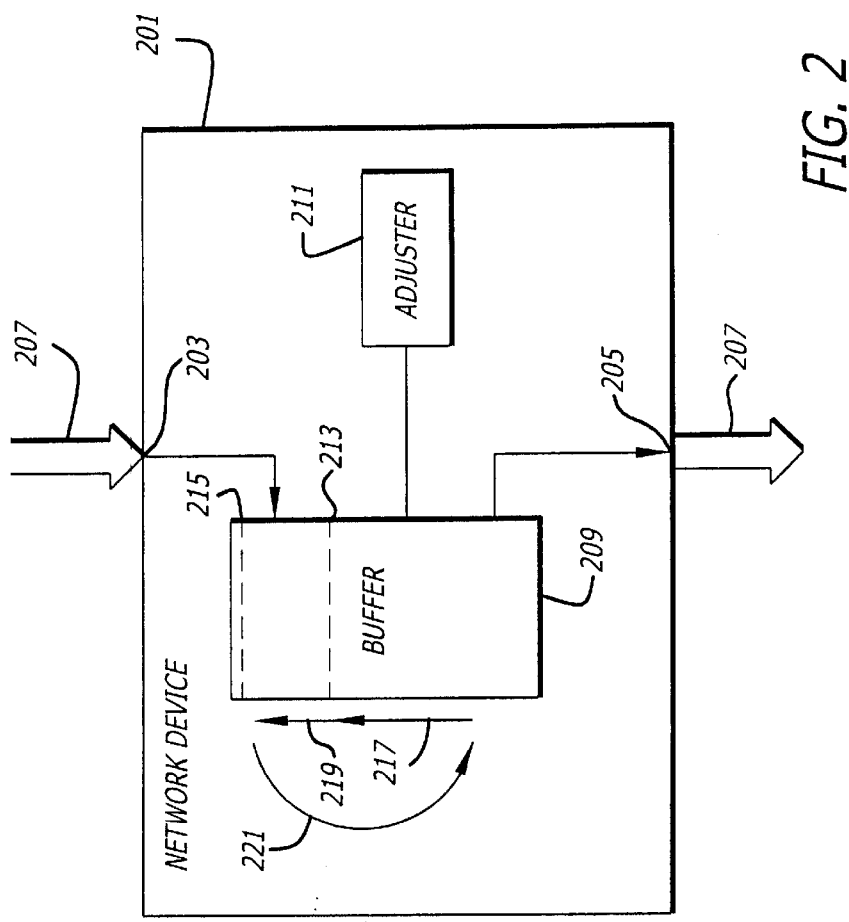
FIG. 2 is a block diagram of a network device with a buffer and an interpacket gap adjuster in accordance with the teachings of the presenting invention.
Figure 1:
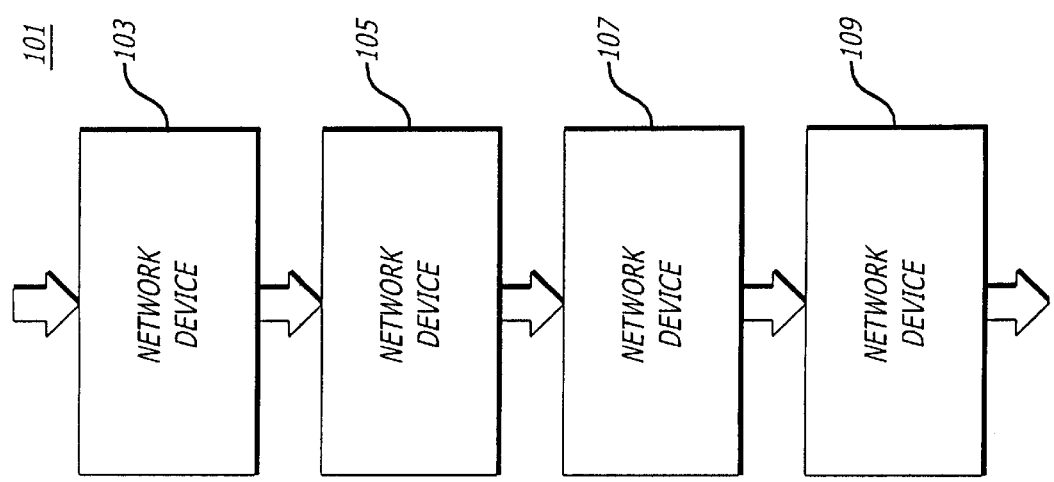
FIG. 1 is a block diagram illustrating a computer network with a plurality of network devices coupled together in series.

FIG. 2 is a block diagram providing a graphical representation of one embodiment of a network device 201 in accordance with the teachings of the present invention. In one embodiment, network device 201 is a stackable switch, repeater, bridge, or another similar type of network device configured to be coupled in series with other network devices. In one embodiment, network device 201 can operate standalone or can be stacked or interconnected into a single logical unit.

Network device 201 includes an input port 203 coupled to receive packets from a network medium, which in one embodiment is a ring 207 of a data communications network. In one embodiment, data is transmitted through the network using Ethernet, or other similar technology. Interpacket gaps are interposed between each of the packets received from ring 207. A buffer 209 is coupled to input port 203 to serve as an elasticity buffer for the packets received from ring 207. As will be discussed in greater detail below, an adjuster 211 is coupled to buffer 209 to selectively adjust the size of interpacket gaps received from input port 203.

Network device 201 retransmits the packets buffered in buffer 209 through output port 205 to ring 207. The packets that are retransmitted from output port 205 are transmitted with interpacket gaps interposed between each packet.

As discussed above, interpacket gaps are interposed between packets of data communications to provide network devices some time to recover between packet transmissions. It is appreciated that there is generally an absolute minimum required interpacket gap size required by network devices in order to provide the minimum time required for network devices to recover. Prior art implementations of network devices generally transmit oversized interpacket gaps far greater in size than the absolute minimum required interpacket gap size to accommodate scenarios of all intermediate network devices shrinking the interpacket gap sizes in the same pass.

In one embodiment, an internal clock (not shown) is employed by network device 201 to clock the receive and transmit speeds of the input port 203 and output port 205, respectively. Thus, input port 203 and output port 205 receive and send data to and from network medium 207 at the same speed. As will be discussed in greater detail below, in one embodiment, network device 201 is one of a plurality of series coupled network devices that are employed in a data communications network. Thus, data received from input port 203 is transmitted from a neighboring upstream network device, and data transmitted through output port 205 is received by a neighboring downstream network device.

In the event that the upstream network device coupled to input port 203 has a faster internal clock than the internal clock of network device 201, buffer 209 will eventually fill. The filling aspect of buffer 209 is illustrated in FIG. 2 with arrow 217. In one embodiment of the present invention, buffer 209 includes a high water mark, which is illustrated in FIG. 2 with dashed line 213. High water mark 209 is a level of capacity of buffer 209 that is less than the total full capacity of buffer 209, which is illustrated in FIG. 2 with dashed line 215.

Operation of the network device 201 in accordance with the teachings of the present invention is as follows. Packets and interpacket gaps are received at input port 203. The data received from input port 203 is buffered in buffer 209. If buffer 209 fills, as shown with arrow 217, high water mark 213 is eventually reached.

In one embodiment, network device 201 checks the sizes of the interpacket gaps that are received from input port 203. In one embodiment, two interpacket gap sizes propagate through network device 201 in accordance with the teachings of the present invention. For purposes of this disclosure, the interpacket gap sizes are referred to as reduced size and increased size.

In one embodiment, the reduced size interpacket gap is equal to or greater than the absolute minimum required interpacket gap size discussed above. The increased size interpacket gap is greater in size than the reduced size, but substantially less in size than the largely oversized interpacket gap sizes that are transmitted from prior art network devices discussed above.

In one embodiment, the increased size interpacket gap of the present invention is the largest interpacket gap size that is propagated through the network in accordance with the teachings of the present invention. Since the increased size interpacket gap of the present invention is smaller than the largely oversized interpacket gaps that are propagated through prior art network devices, overall network speed and performance is improved with the present invention.

Referring back to FIG. 2, buffer 209 may eventually fill to high water mark 213 during operation, as indicated by arrow 217. Once the amount that buffer 209 is filled rises to or above high water mark 213, adjuster 211 shrinks the size of the interpacket gap under certain conditions. In one embodiment, adjuster 211 only shrinks interpacket gaps that are received from input port 203 at an increased size. Adjuster 211 selectively shrinks these increased size interpacket gaps to reduced size interpacket gaps. However, if a reduced size interpacket gap is received from input port 203, adjuster 211 will not shrink the interpacket gap, even if buffer 209 is filled to or above high water mark 213. Consequently, the amount that buffer 209 is filled will continue to rise, as illustrated in FIG. 2 with arrow 219.

In one embodiment, as soon as an increased size interpacket gap is received from input port 203, adjuster 211 adjusts or shrinks the size of the interpacket gap from the increased size to the reduced size. By shrinking the interpacket gap to the reduced size, the amount that buffer 209 is filled drops to a level significantly below high water mark 213. This aspect of the present invention is illustrated with arrow 221 in FIG. 2.

In one embodiment, the high water mark 213 level is selected to be at a location low enough below total capacity 215 of buffer 209 to ensure that an increased size interpacket gap is received before an overflow error occurs in buffer 209. In one embodiment, high water mark 213 is determined based on the total number of series coupled network devices, the maximum tolerated internal clock differences between network devices and interpacket gap sizes.

Figure 3:
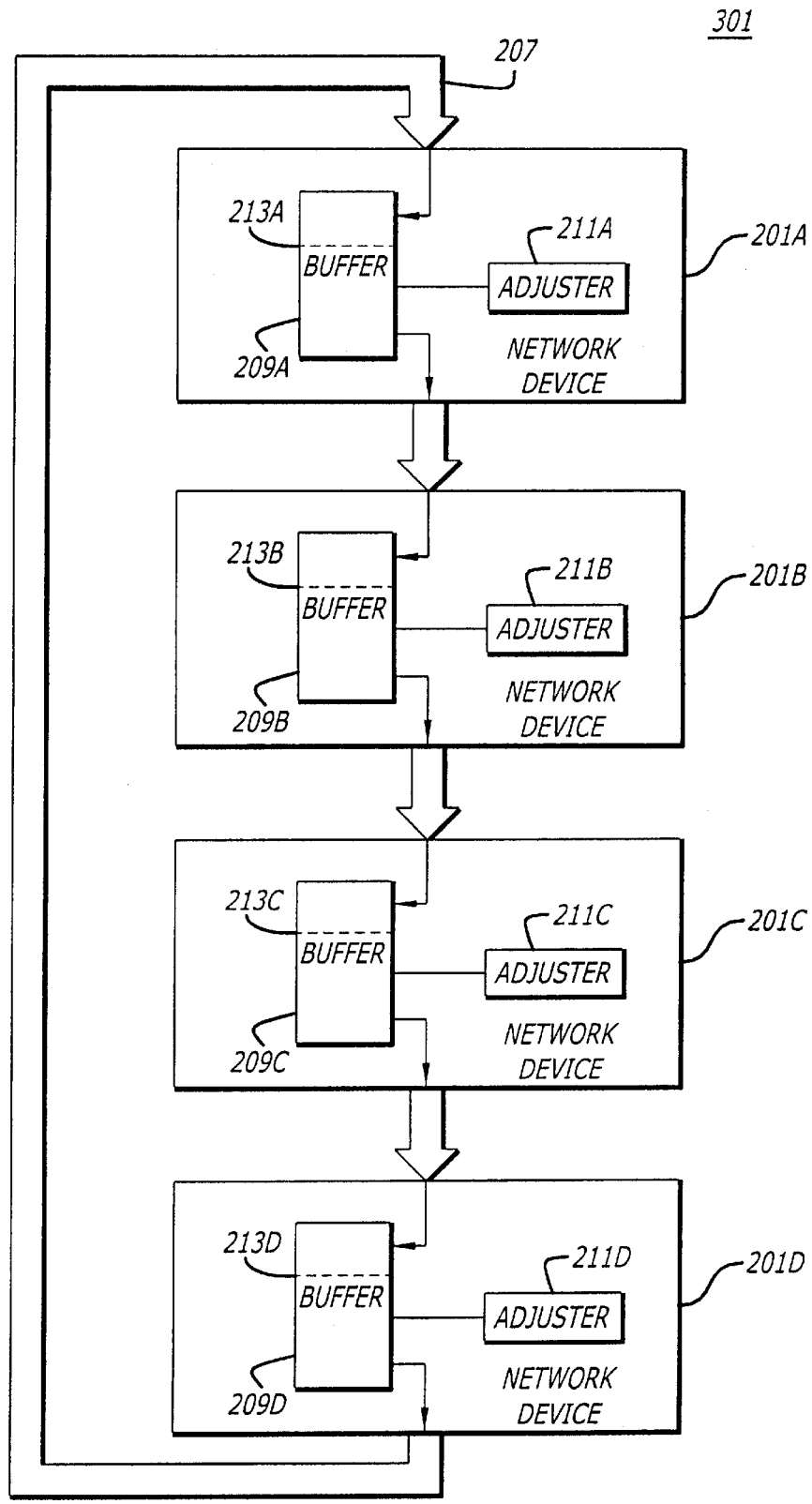
FIG. 3 is a block diagram illustrating a computer network including a plurality of network communications devices in accordance with the teachings of the present invention.

FIG. 3 is a block diagram illustrating a data communications network 301 having a plurality of network devices 201A–D in accordance with the teachings of the present invention. In one embodiment, network devices 201A–D are coupled in series through a network medium. In FIG. 3, the network medium is illustrated in one embodiment as a ring 207 coupling together network devices 201A–D in series. Thus, network device 201A sends packets to network device 201B. Network device 201B sends packets to network device 201C. Network device 201C sends packets to network device 201D. Network device 201D sends packets to network device 201A. In one embodiment, interpacket gaps are interposed between all packets that propagate through ring 207. In one embodiment, network devices 201A–D are substantially similar to the network device 201 described with respect to FIG. 2 above.

Operation of network 301 with network devices 201A–D is as follows. Assume that network devices 201A–D transmit and receive data relative to their own internal clock. Assume further that the internal clock of network device 201D is slightly slower than the internal clock of network device 201C, that the internal clock of network device 201C is slightly slower than the internal clock of network device 201B and that the internal clock of network device 201B is slightly slower than the internal clock of network device 201A. Thus, in this scenario, the amounts that buffers 209B, 209C and 209D of network devices 201B, 201C and 201D, respectively, are filled will rise during network operation. In one embodiment, network device 201A is assigned the status of being the first upstream device in ring 207. For purposes of this discussion, the remaining network devices 201B, 201C and 201D are considered downstream network devices relative to network device 201A in ring 207.

In one embodiment, since network device 201A is the first upstream device, adjuster 211A of network device 201A using known techniques adds an extra N cycles to the reduced size interpacket gaps that are transmitted to network device 201B. By adding the extra N cycles to the reduced size interpacket gaps, increased size interpacket gaps are transmitted to network device 201B. Thus, in one embodiment, the increased size interpacket gaps are equal to the reduced size interpacket gaps plus the extra N cycles. In one embodiment, N is selected to be a value that will enable a network device to free additional storage capacity in its internal buffer when the interpacket gap sizes are reduced from increased size to reduced size.

Since the internal clock of network device 201B is running slightly slower than the internal clock of network device 201A, buffer 209B is eventually filled to its high water mark 213B. As a result, adjuster 211B adjusts or shrinks the next increased size interpacket gap that is received from network device 201A. After adjuster 211B shrinks the increased size interpacket gap to a reduced size interpacket gap, substantially more storage capacity will be freed in buffer 209B in one embodiment of the present invention. However, the reduced size interpacket gap will be transmitted downstream to network device 201C.

Since the internal clock of network device 201C is running slightly slower than the internal clock of network device 201B, buffer 209C is also eventually filled to or above its high water mark 213C. However, if network device 201C receives a reduced size interpacket gap from network device 201B, then adjuster 211C is not allowed to further reduce or shrink the interpacket gap, even if buffer 209C is filled to or above high water mark 213C. In this situation, the size of reduced size interpacket gap as received is maintained and retransmitted downstream to network device 201D.

Since the internal clock of network device 201D is running slightly slower than the internal clock of network device 201C, buffer 209D is also eventually filled to or above its high water mark 213D. Similar to the situation described above with respect to network device 201C, if network device 201D receives a reduced size interpacket gap from network device 201C, then adjuster 211D is not allowed to further reduce or shrink the interpacket gap, even if buffer 209D is filled to or above high water mark 213C. In this situation, the size of reduced size interpacket gap as received is maintained and retransmitted downstream through ring 207.

In an embodiment implemented using a ring topology, packets eventually propagate through ring 207 back to network device 201A for another pass. Since network device 201A is the first upstream device in this embodiment, adjuster 211A of network device 201A adjusts the interpacket gaps as necessary such that increased size interpacket gaps that are transmitted to network device 201B.

It should be noted, however, that if for some reason buffer 209A is filled to or above its high water mark 213A and if an increased size interpacket gap is received from input port 203A, adjuster 211A reduces the size of the interpacket gap to the reduced size to free additional storage capacity in buffer 209A. In this special case, network device 201A transmits a reduced size interpacket gap.

Referring back to the example being described above, since buffer 209B is at this time filled to a level below high water mark 213B, the size of the interpacket gap received from network device 201A is maintained and retransmitted downstream to network device 201C. Thus, if an increased size interpacket gap is received in this example, the size is maintained by network device 201B and an increased size interpacket gap is therefore transmitted downstream to network device 201C.

Network device 201C therefore receives an increased size interpacket gap in this pass. Thus, adjuster 211C is able to adjust or shrink the size of the interpacket gap received from network device 201B to the reduced size. After adjuster 211C shrinks the increased size interpacket gap to the reduced size interpacket gap, buffer 209C will have substantially more capacity. However, the reduced size interpacket gap will be transmitted downstream to network device 201D.

Similar to the last pass described above, if network device 201D receives a reduced size interpacket gap from network device 201C, then adjuster 211D is once again not allowed to further reduce or shrink the interpacket gap, even if buffer 209D is filled to or above high water mark 213C. In this situation, the size of reduced size interpacket gap as received is again maintained and retransmitted downstream through ring 207.

Continuing further with the example described above, since all of the buffers of the upstream network devices, buffers 209B and 209C in this example, are now filled to levels below the high water marks, network device 201D will finally receive an increased size interpacket gap from its neighboring upstream network device. Thus, adjuster 211D is finally able to adjust or shrink the size of the interpacket gap received from network device 201C to the reduced size. After adjuster 211D shrinks the increased size interpacket gap to the reduced size interpacket gap, buffer 209D will have substantially more capacity.

In the embodiment described above, it is observed that only one network device 201A–D in ring 207 will be allowed to shrink the interpacket gap for each pass. Indeed the network devices that are downstream from the network device that shrinks the interpacket gap receive reduced size interpacket gaps. Thus, it is also observed that the interpacket gap size is reduced by sequential network devices 201A–D for each pass. In particular, network device 201B adjusted the size of the interpacket gap from the increased size to the reduced size in one pass. In the following pass, the next sequential downstream device, network device 201C, adjusted the size of the interpacket gap from the increased size to the reduced size. Finally, in the following pass, the next sequential downstream device, network device 201D, adjusted the size of the interpacket gap from the increased size to the reduced size.

It is appreciated that although the network devices illustrated in FIG. 3 are arranged in a ring topology with ring 207, the network devices 201A–D may also be arranged in other topologies in accordance with the teachings of the present invention. For example, network devices 201A–D may be arranged as repeaters, or other similar devices, in which data is transmitted in packets with interpacket gaps interposed between each packet. In the other embodiments of the present invention, the first upstream device would send increased size interpacket gaps and downstream network devices are only allowed to shrink increased size interpacket gaps.

Figure 4:
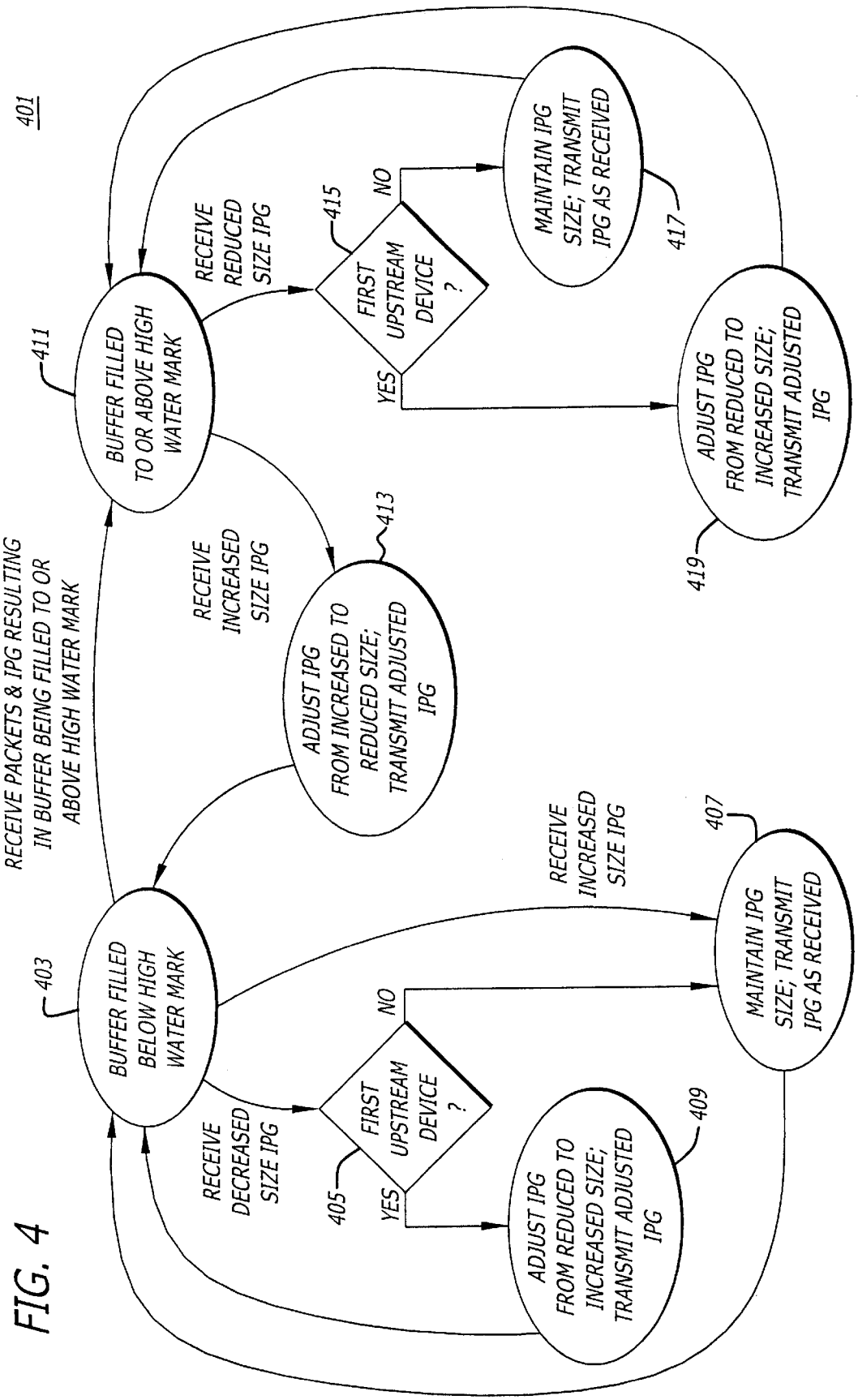
FIG. 4 is a state transition diagram describing the operation of a network device in accordance with the teachings of the present invention.

In one embodiment, operation of each network device 201A–D of FIG. 3 may be described as a state machine with respect to state transition diagram 401 of FIG. 4. In particular, state 403 illustrates the state in which the internal buffer of the network device is filled to a level below the high water mark. If an increased size interpacket gap (IPG) is received, then the interpacket gap size is maintained and retransmitted, as indicated in state 407. If a reduced size interpacket gap is received, the gap size is also maintained and retransmitted, unless the network device is the first upstream device. In the special case that the upstream network device receives a reduced size interpacket gap, the interpacket gap size is adjusted to be an increased size interpacket gap, which is then retransmitted. These aspects of the present invention are illustrated in decision step 405 and states 407 and 409. After the interpacket gaps are retransmitted, the network device transitions back to state 403.

If the network device receives packets and interpacket gaps that result in the internal buffer of the network device to be filled to or above the high water mark, the network device transitions to state 411. Once in state 411, if the network device receives a reduced size interpacket gap and the network device is not the first upstream device, the size of the interpacket gap is maintained and retransmitted. This aspect of the present invention is illustrated in decision step 415 and state 417. After the interpacket gap is retransmitted, the network device transitions back to state 411. If the network device receives an increased size interpacket gap while the network device is in state 411, the interpacket gap size is adjusted to be a reduced size interpacket gap, which is then retransmitted, as shown in state 413. After the interpacket gap is retransmitted, the network device transitions back to state 413 since the internal buffer will now be filled below the high water mark.

In the foregoing detailed description, the method and apparatus of the present invention has been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

What is claimed is:

1. A network device, comprising:
   a buffer coupled between an input port and an output port of the network device, the buffer coupled to buffer packets propagating through a data communications network received through the input port, each of the packets having an interpacket gap (IPG) interposed therebetween; and
   an adjuster coupled to the buffer, the adjuster selectively adjusting a size of the IPG received through the input port, wherein the packets are retransmitted out the output port with the size of the IPG maintained if the IPG is received at the input port at a reduced size when the buffer is filled to a level at or above a first level of capacity of the buffer or when the buffer is filled to a level below the first level of capacity of the buffer.

2. The network device described in claim 1 wherein the packets are retransmitted from the output port with the IPG adjusted from an increased size to the reduced size if the IPG is received at the input port at the increased size and if the buffer is filled to the level at or above the first level of capacity the buffer.

3. The network device described in claim 1 wherein the packets are retransmitted out the output port with the IPG at the increased size if the IPG is received at the input port at the increased size and if the buffer is filled to a level below the first level of capacity the buffer.

4. The network device described in claim 1 wherein the adjuster is further coupled to adjust the size of the IPG to the increased size if the IPG is received at the input port at the reduced size and if the network device is a first upstream one of a plurality of network devices in the data communications network.

5. The network device described in claim 4 wherein the plurality of network devices in the data communications network are arranged in a ring topology.

6. The network device described in claim 1 wherein the increased size of the IPG is greater than the reduced size of the IPG by an amount corresponding to a time duration greater than or equal to a total number of the plurality of network devices in the data communications network arranged in the ring topology times a maximum clock difference between neighboring network devices of the plurality of network devices.

7. The network device described in claim 6 wherein the first level of capacity is less than a total capacity of the buffer by a size corresponding to the time duration greater than or equal to the total number of the plurality of network devices in the data communications network arranged in the ring topology times the maximum clock difference between neighboring network devices of the plurality of network devices.

8. The network device described in claim 1 wherein the packets are propagated through the data communications network in an Ethernet format.

9. The network device described in claim 1 wherein the network device comprises a network switch.

10. The network device described in claim 1 wherein the network device comprises a network repeater.

11. A method of modulating an interpacket gap (IPG) between packets, the method comprising the steps of:
receiving the packets with a network device, the network device included among a plurality of network devices coupled in series in a data communications network, the packets propagating through the data communications network with the IPG interposed therebetween;
buffering the packets in a buffer included in the network device;
maintaining a size of the IPG if the IPG was received by the network device at a reduced size when the buffer is filled to a level at or above a first level of capacity of the buffer or when the buffer is filled to a level below the first level of capacity of the buffer;
retransmitting the packets with the IPG from the network device; and
adjusting the size of the IPG to the reduced size if the IPG was received by the network device at an increased size and if the buffer is filled to the level above the level of capacity of the buffer.

12. The method described in claim 11 including the additional step of maintaining the size of the IPG if the was received by the network device at the increased size and if the buffer is filled to a level below the first level of capacity of the buffer.

13. The method described in claim 11 including the additional step of adjusting a size of the IPG to the increased size if the IPG was received by the network device at the reduced size and if the network device is a first upstream one of the plurality of network devices in the data communications network.

14. A data communications network, comprising:
a plurality of network devices coupled in series, wherein each one of the network devices includes:
a buffer coupled between an input port and an output port of the network device, the buffer coupled to buffer packets propagating through the data communications network received through the input port, each of the packets having an interpacket gap (IPG) interposed therebetween; and
an adjuster coupled to the buffer, the adjuster selectively adjusting a size of the IPG received through the input port, wherein the packets are retransmitted out the output port of the network device with the IPG at a reduced size if the IPG is received at the input port of the network device at the reduced size when the buffer of the network device is filled to a level at or above a first level of capacity of the buffer or when the buffer of the network device is filled to a level below the first level of capacity of the buffer.

15. The data communications network described in claim 14 wherein the packets are retransmitted from the output port with the IPG adjusted from an increased size to the reduced size if the IPG is received at the input port at the increased size and if the buffer is filled to a level at or above a first level of capacity the buffer.

16. The data communications network described in claim 14 wherein the packets are retransmitted out the output port of the network device with the IPG at the increased size if the IPG is received at the input port of the network device at the increased size and if the buffer of the network device is filled to a level below the first level of capacity the buffer of the network device.

17. The data communications network described in claim 14 wherein the adjuster of the network device is further coupled to adjust the size of the IPG to the increased size if the IPG is received at the input port of the network device at the reduced size and if the network device is a first upstream one of a plurality of network devices in the data communications network.

18. The data communications network described in claim 14 wherein the plurality of network devices coupled in series are arranged in a ring topology.

* * * * *

UNITED STATES PATENT AND TRADEMARK OFFICE
CERTIFICATE OF CORRECTION

PATENT NO. : 6,226,290 B1  
DATED : May 1, 2001  
INVENTOR(S) : Salett et al.

Page 1 of 1

It is certified that error appears in the above-identified patent and that said Letters Patent is hereby corrected as shown below:

Title page,
Item [56] References Cited, under OTHER PUBLICATIONS, at "Calculating the Interframe Gap Shrinkage", after "/10quickref/ch7qr" delete the excess spaces so that only two spaces occur before "8.html,".
Item [56] References Cited, under OTHER PUBLICATIONS, at "Calculating the Interframe Gap Shrinkage", delete "Wuick" and insert -- Quick --.

Column 9, claim 11,
Line 43, after "above the" insert -- first --.

Column 9, claim 12,
Line 46, after "if the" insert -- IPG --.

Signed and Sealed this

Twenty-sixth Day of March, 2002

Attest:

JAMES E. ROGAN
*Attesting Officer*   *Director of the United States Patent and Trademark Office*